Jan. 6, 1970  E. J. BRENNAN  3,488,089
FRONT FOLDING TRAY FOR A VEHICLE SEAT
Filed April 15, 1968
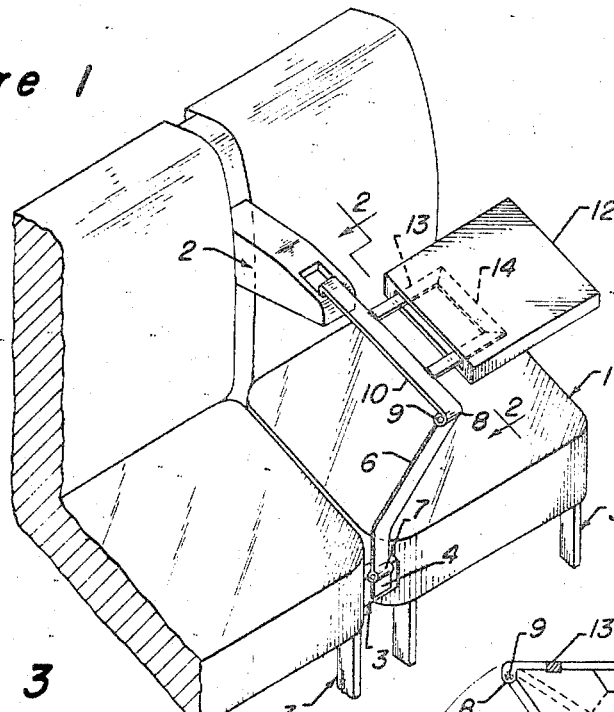
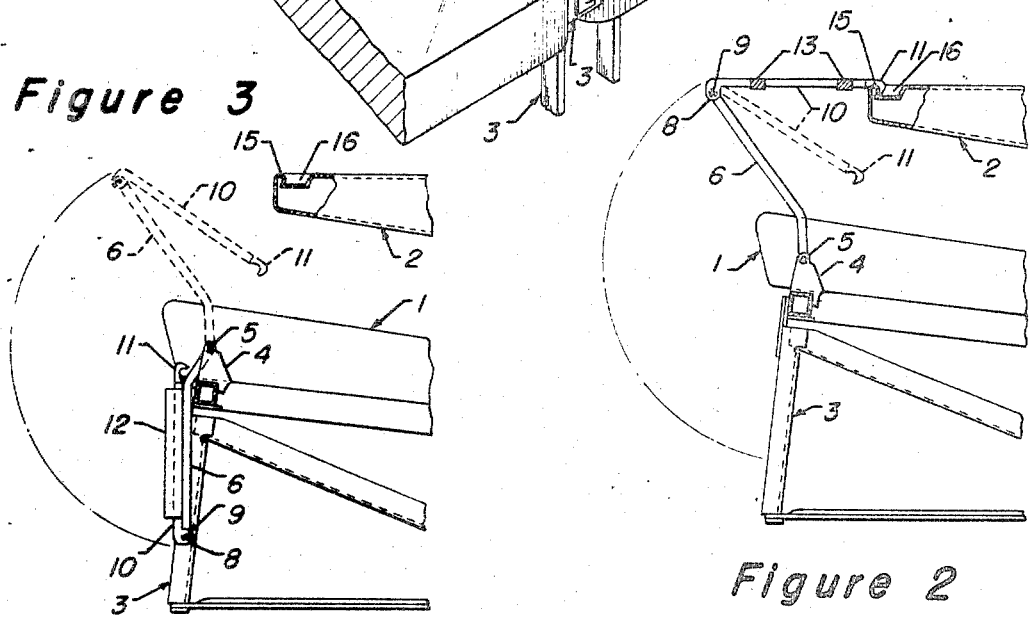
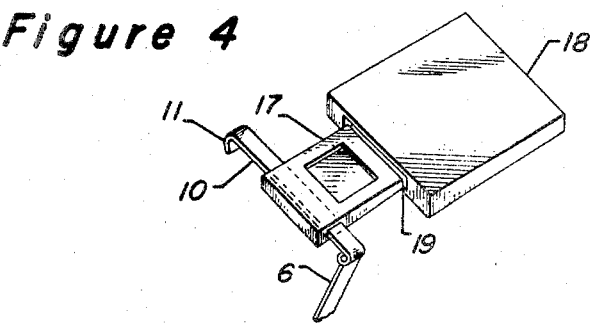
INVENTOR:
Edward J. Brennan
BY:
James R. Hoatson, Jr.
Philip T. Liggett
ATTORNEYS

United States Patent Office 3,488,089
Patented Jan. 6, 1970

3,488,089
FRONT FOLDING TRAY FOR A VEHICLE SEAT
Edward J. Brennan, Litchfield, Conn., assignor to Universal Oil Products Company, Des Plaines, Ill., a corporation of Delaware
Filed Apr. 15, 1968, Ser. No. 721,419
Int. Cl. A47b 3/14
U.S. Cl. 297—162     4 Claims

ABSTRACT OF THE DISCLOSURE

A front-mounted, "fold-away" serving tray for a vehicle seat is constructed of a hinged support leg and a hinged arm section, with cantilevering tray holding means provided from the latter to accept a removable tray. The hinging of the arm and support leg sections, as well as the connection to the upper side portion of the seat support is such that the entire unit will fold and stow under the front edge of the seat behind an occupant's legs.

---

The present invention relates to a novel form of front-mounted, fold-away serving tray for a vehicle seat. More particularly, there is provided a tray support construction which has folding arm and leg means hinged from the top portion of the seat support structure such that the tray will be suspended and stowed under the front edge of the seat behind an occupant's legs.

It is realized that there are various types of front folding trays or tables such as have been utilized on chairs or desks; however, these usual forms of tables or trays are not conventional with passenger seats in aircraft or in other vehicles. Further, the known forms of front folding trays do not provide for folding and stowing the entire support leg and arm means, along with the tray means, under the front edge of a seat and back of the passenger's legs so as to not interfere with his comfort.

It may be considered a principal object of the present invention to provide a front folding table support construction which permits the folding of the support leg and arm means such that it is all stowed below the seat cushion level of the vehicle seat and back under the front edge of such seat.

It may be considered a further object of the folding assembly to provide for the easy removal of the larger food tray portion thereof from the supporting section, so that only a small lateral member is left to stow under the front edge of a seat.

Briefly, the present invention provides for a front mounted, fold-away serving tray unit for use in combination with a vehicle seat having side arm means and comprises in combination, a supporting leg member hingedly connecting with the vehicle seat framing adjacent the seat cushion level, a side arm member hingedly connecting with the movable end of said leg member at one end thereof and having a latching means at the other end thereof adapted to connect with arm means of said vehicle seat, tray holding means connecting to and cantilevering from said side arm member, and serving tray means connecting with said cantilevering tray holding means, whereby the detaching of the latching means of said side arm member and the folding movement thereof through a vertical arc along with said leg member permits the connecting tray holding means to in turn move through a vertical arc to be suspended under and parallel with the front edge of the vehicle seat.

In a preferred construction, the serving tray or table for the use of the passenger will be detachably connected to the side arm member or from the tray holding means in combination therewith. Thus, a large tray or table can be taken away and stored as desired, rather than permit it to be in a suspended edge-wise position below the front edge of the vehicle seat. Also, by having a detachable form of table or tray there can be varying types and sizes of trays which may be utilized in combination with a standard form of supporting leg and arm member.

In a special embodiment, the present invention utilizing the front, fold-away support arrangement, may have a small cocktail size tray attached to or otherwise cantilevering laterally out from the side arm portion of the supporting frame and such small sized tray will be constructed to be capable of holding a larger sized table or tray more suitable for serving a full meal.

Various types of side arm attachment means may be provided for holding the free end of the foldable supporting structure, however, in a simplified construction and arrangement, there may be utilized a simple latch arrangement such as a hook portion at the end of the framing arm which will in turn slip into a suitable recessed slot or over a shoulder or edge section in turn mounted as a part of a side arm portion of the vehicle seat. Thus, by merely lifting the hook end of the side arm frame member out of the latching position, then the entire folding assembly will be free to hinge and move forwardly around a lower hinge or pivot point on the seat framing to provide for the entire folding and stowage of the support leg and arm means, as well as table means, under the front edge portion of the seat cushion at a position normally behind the passenger's legs.

Inasmuch as seat designs for the future, particularly for aircraft, will require that there be a front bulk-head or wall means to enclose luggage that is under the seat, then the folded frame and table means will generally come to rest under the front edge of the seat adjacent the front wall portion of the under seat structural support. On the other hand, the table in its depending and stowed position may well serve in part as an under seat baggage restraining wall. In order that the table supporting leg and arm members will permit the table to come to rest under and laterally along the front edge of the seat supporting structure, there generally will be provided a hinge connection to the seat supporting structure that initiates from the upper edge of such structure at a level adjacent the bottom of the seat cushion. Also, in order that the folding supporting leg and arm means be out of the way of the seat occupant, then such framing members will preferably be upwardly from the side of the seat and preferably between seats where there are one or more adjacent seats in a row-like manner.

Reference to the accompanying drawing and the following description thereof will serve to illustrate the design and construction of the present improved front folding tray arrangement as well as serve to illustrate further advantageous features in connection therewith.

DESCRIPTION OF THE DRAWING

FIGURE 1 of the drawing is an isometric type view indicating the front folding tray arrangement in a raised utility position and a detachable form of serving tray extending laterally from holding means.

FIGURE 2 of the drawing is a sectional elevational view through the tray supporting framing, with the supporting leg and arm members shown in the raised position, as indicated by line 2—2 in FIGURE 1.

FIGURE 3 is a side elevational view of the front folding tray unit shown in a suspended or stowed position at the front edge of the vehicle seat.

FIGURE 4 shows, in an isometric view, the utilization of a small cocktail-sized serving tray in combination with the side arm member of the folding unit and, in addition, that a larger sized table or tray may be slid over the smaller tray so that the latter serves as the internal support.

Referring now particularly to FIGURES 1 and 2 of the drawing there is indicated a passenger seat 1 with side arm means 2 and lower supporting structure means 3. Between seat units 1, and at the front edge of the lower seat supporting structure 3, there is a suitable bracket means 4 which, as shown in FIGURE 2, may be of the nature of a clevis adapted to hold a pin 5 in a hinged joint with the lower end of tray support leg 6. The supporting leg member 6 may be provided with an enlarged hub or cylindrical portion 7 at its lower end to accommodate the pin 5, and fit into the bracket means 4. In a similar manner the upper or outer end of leg 6 may have an internal hub portion or a clevis portion at 8 to hold a pin 9. In other words, a hinged pin form of connection means is provided between the upper end of leg 6 and the forward end of a side arm member 10. The latter member is, in this instance, indicated as having a hook portion 11 at its aft, or free end, so that there may be an easy connection into arm means 2 which is part of the vehicle seat 1.

Various forms of tray attachment means may be provided in combination with the horizontal side arm member 10. However, preferably, there will be a cantilevering tray holding means extending laterally from at least one side portion of the arm member 10 such that there will be adequate support for a detachable tray or table 12. In a simplified illustration, there are shown cantilevering framing bars 13 and a tie bar 14 across the ends of the latter such that there is a structurally solid and rigid tray holding means for the mounting of any sized tray. Preferably, the laterally extending members 13, as well as member 14, will be of a relatively shallow and structurally strong type of construction so as to permit the tray 12 to slide thereover and become fixed into a desired serving or writing position. Tray 12 may have a large slot to accommodate the members 13 or, alternatively, various types of separate slots or tracks may be provided to engage extension members in the positions of bars 13 which have special cross-sections. Generally, the sliding, friction engagement between the bars and the track or slot means will permit adequate positioning and holding of the tray onto the mounting members, however, where desired suitable hook means, spring bottoms or clamps, etc. may be utilized to effect the positive holding of one member to the other.

With respect to the free end of the side arm member 10, it is not intended to limit the present invention to any one form of hook or latching means for use in combination with the seat arm 2. However, one simplified form of attachment may embody a hook such as 11 which in turn is adapted to fit tightly around a projecting edge or shoulder portion 15 as part of an ash tray or other recessed section 16 being embedded within the arm section 2. On the other hand, a raised form of escutcheon plate may be mounted above the upper surface of the projecting seat arm 2 and have a cross-arm or bar member which will serve to fit into the hook portion 11 of arm member 10.

In FIGURE 3 of the drawing, it will be noted that the horizontal arm member 10 has been released from its hooked or latched position with respect to arm 2 and then permitted to fold back adjacent the side of the supporting leg 6. The latter is in turn pivoted about pin 5 approximately 180° to come to rest in a substantially vertical position below the front edge portion of the cushion of seat 1. Thus, where there is an attached tray portion 12 slid on, or otherwise held, to the laterally projecting bars 13 from arm member 10 there will also be a resulting vertically position tray stowed under the front edge of the seat 1 in a manner which would be back of a seat occupant's legs. When it is desired to raise the serving tray or table into a utility position, all that is necessary is for the occupant of the vehicle seat to lean his legs to one side and lift the entire tray assembly including the support leg means 6 through an arc of approximately 180° and at the same time unfold the upper side arm member 10 from the latter so as to have the free end 11 available for hooking into the shoulder means 15 on seat arm member 2.

As best shown diagrammatically in FIGURE 4, there is indicated a small cocktail sized serving tray 17 held in a cantilever-like manner from the side of a framing arm member 10. This small sized tray may, if desired, be permanently or substantially fixedly attached to the side arm framing so that it remains with the latter in either the upright or folded positions and available for quick usage. In addition, there is indicated the utilization of a larger table or tray 18 having a slotted or grooved arrangement at 19 which will provide a relatively tight slidable fit over the small sized tray 17, whereby tray 18 may be readily mounted on the latter or detachably removed in a rapid manner. The larger tray 18 will, of course, provide an adequate serving tray for meals or, alternatively, may serve as a writing table for the seat occupant. Here again, spring holding means, or mechanical hooks, latches, etc. may be embodied in effecting the relatively tight attachment of tray 18 over the smaller tray 17; however, generally, with the proper sizing and sliding fit of one tray with respect to the other, the normal frictional holding will be satisfactory in effecting the attachment of the larger tray to the smaller one.

It is not intended to limit the scope of the present improved front folding arrangement to the diagrammatic embodiments which have been shown and described in connection with the present drawing, nor is it intended to limit the support assembly and the tray units to any one type of material. Generally, for aircraft seating units, the support arm members will be of aluminum or of a hollow tubular form so that they will be of a minimum weight. Also, the tray portions will generally be of a plastic covered light weight metal, or covered light weight wood, such that there is a minimum of weight and, at the same time, a smooth and cleanable surface. Still further, as indicated hereinbefore, it is not intended to limit the utility of the present front folding table unit to aircraft or to any one type of vehicle seat inasmuch as train or bus seats might well utilize the present improved arrangement.

I claim as my invention:

1. In combination with a vehicle seat having side arm means, a front mounted fold-away serving tray, which comprises in combination, a supporting leg member hingedly connecting with the vehicle seat framing adjacent the seat cushion level, a side arm member hingedly connecting with the movable end of said leg member at one end thereof and having a latching means at the other end thereof adapted to connect with arm means of said vehicle seat, tray holding means connecting to and cantilevering from said side arm member, and serving tray means connecting with said cantilevering tray holding means, whereby the detaching of the latching means of said side arm member and the folding movement thereof through a vertical arc along with said leg member permits the connecting tray holding means to in turn move through a vertical arc to be suspended under and parallel with the front edge of the vehicle seat.

2. The combination of claim 1 further characterized in that said latching means for said side arm member with the vehicle seat arm comprises a hook means on the end of the side arm member sized and adapted to engage a cross-bar portion at the front edge of a recess means within said seat arm.

3. The combination of claim 2 further characterized in that said serving tray means is slidably and detachably connected with said tray holding means cantilevering from the side arm member whereby such tray means may be removed.

4. The combination of claim 1 further characterized in that said tray holding means comprises a small sized solid bottom tray attached to and extending in a cantilevering manner from said side arm member, and said serving tray means is of a substantially larger size than said small tray holding means and has connecting means to slidably engage the latter, whereby there may be a rapid installation of a larger sized tray over a fixed-in-place smaller tray.

References Cited

UNITED STATES PATENTS

| 668,489 | 2/1901 | Collignon | 297—102 |
| 1,731,293 | 10/1929 | Chapman | 297—162 |
| 3,269,772 | 8/1966 | Brunskole | 297—162 |

FOREIGN PATENTS

| 1,153,485 | 10/1957 | France. |
| 802,011 | 2/1951 | Germany. |

JAMES T. McCALL, Primary Examiner

U.S. Cl. X.R.

297—154, 170